United States Patent [19]

Kihara et al.

[11] 4,183,067

[45] Jan. 8, 1980

[54] HELICAL SCAN VTR WITH MEANS FOR DISPLACING HEAD ALONG TRACK DIRECTION

[75] Inventors: Nobutoshi Kihara, Tokyo; Yoshimi Watanabe, Yokohama, both of Japan

[73] Assignee: Sony Corporation, Tokyo, Japan

[21] Appl. No.: 862,052

[22] Filed: Dec. 19, 1977

[30] Foreign Application Priority Data

Dec. 23, 1976 [JP] Japan .................. 51-155243

[51] Int. Cl.² .................. G11B 5/52; G11B 21/04; H04N 5/78
[52] U.S. Cl. .................. 360/75; 360/107; 360/33; 360/84
[58] Field of Search .................. 360/11, 36, 109, 107, 360/75, 33, 64, 84, 70; 310/317, 332

[56] References Cited

U.S. PATENT DOCUMENTS

| | | | |
|---|---|---|---|
| 3,188,385 | 6/1965 | Kihara | 360/107 |
| 3,213,193 | 10/1965 | Konishi | 360/70 |
| 3,213,204 | 10/1965 | Okamura | 360/73 |
| 3,441,687 | 4/1969 | Inoue | 360/64 |
| 3,787,616 | 1/1974 | Falk | 360/75 |
| 3,916,226 | 10/1975 | Knoll | 310/317 |
| 4,075,666 | 2/1978 | Lomax | 360/11 |

*Primary Examiner*—Bernard Konick
*Assistant Examiner*—Alan Faber
*Attorney, Agent, or Firm*—Lewis H. Eslinger; Alvin Sinderbrand

[57] ABSTRACT

In a VTR for recording and/or reproducing video signals in parallel tracks extending obliquely on a magnetic tape which is wrapped helically on a guide drum, rotary magnetic heads are associated with the guide drum to move in respective circular paths which coincide with the guide drum surface and which are axially spaced apart on the latter so that the heads obliquely traverse respective longitudinal zones substantially equally dividing the width of the magnetic tape. The angular spacing between the heads and the angular extent of the guide drum surface about which the tape is wrapped are selected so that, when the heads are rotated for obliquely traversing the respective tape zones in a repeating cyclic order, the latter has at least one overlapping interval in which two of the heads simultaneously scan oblique tracks in the respective zones. In the reproducing mode of the VTR, signals reproduced by the heads from tracks in the respective zones and being scanned in the repeating cyclic order are sequentially combined and, during each overlapping interval, a comparator senses phase differences between signals reproduced by the two heads which are then simultaneously traversing the respective zones and provides a corresponding compared output. A head shift signal is generated in response to such compared output and is employed, for example, by application to a bimorph leaf mounting at least one of the heads, for displacing such head in a direction along the respective tracks scanned thereby so as to eliminate the phase differences.

19 Claims, 16 Drawing Figures

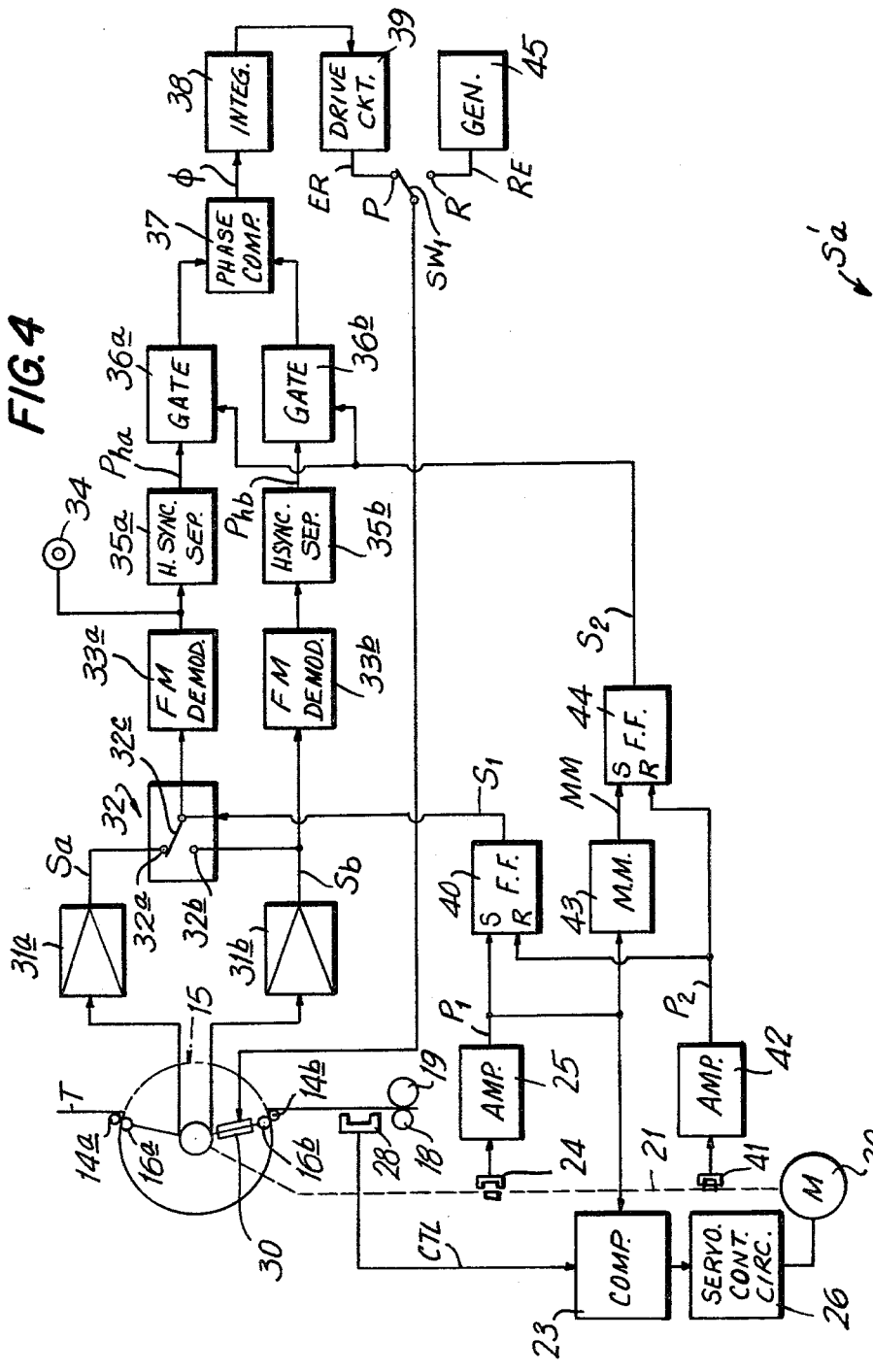
FIG. 4
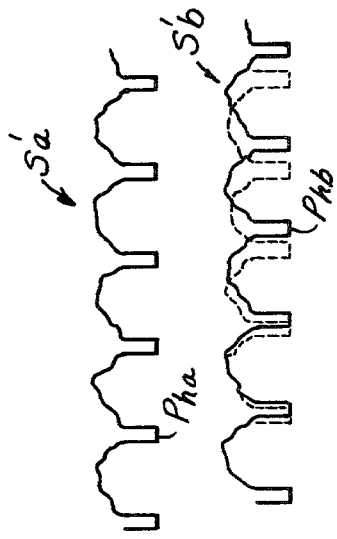
FIG. 6A
FIG. 6B

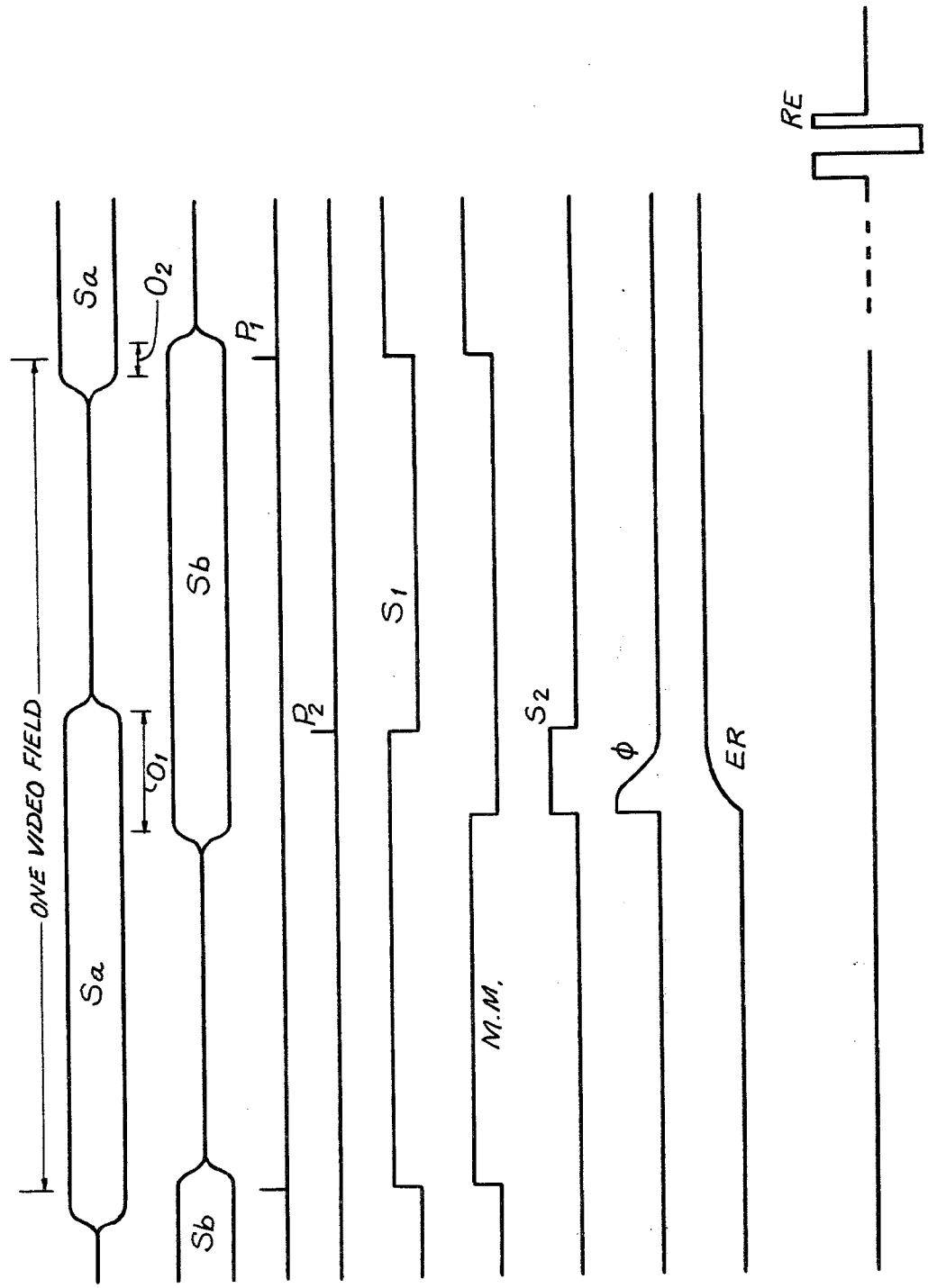

HELICAL SCAN VTR WITH MEANS FOR DISPLACING HEAD ALONG TRACK DIRECTION

BACKGROUND OF THE INVENTION

1. Field of the Invention

This invention relates generally to apparatus for recording and/or reproducing video signals, and more particularly is directed to improvements in such apparatus of the type known as a helical scan VTR or video tape recorder.

2. Desription of the Prior Art

Various types of video tape recorders, hereinafter called VTRs, have been developed, for example, the so-called 4-head Ampex-type or the helical scan-type which may employ a Ω-wrap of 180° or 360° or an α-wrap. The most popular of the helical scan VTRs is the 180° Ω-wrap with two rotary recording or reproducing magnetic heads. Generally speaking, helical scan VRTs have many advantages over the 4-head Ampex type VTRs. More particularly, helical scan VTRs can be easily changed-over between various playback or reproducing modes, such as, a slow-motion mode, a quick-motion or speeded-up mode and a stop or still-motion mode.

Among the existing helical scan VTRs, the 180° Ω-wrap type is advantageous, as compared with the 360° Ω-wrap or α-wrap type in that a relatively small angular extent of the tape guide drum surface is engaged and, therefore, the frictional resistance to longitudinal movement of the magnetic tape relative to the guide drum is correspondingly reduced. Such reduced frictional resistance to longitudinal movement of the tape correspondingly reduces the stretching of the tape during playback or reproducing and skew distortion in the reproduced video picture can be minimized. Further, it is difficult to maintain smoothness of the tape on the guide drum surface in the case of a 360° Ω-wrap or α-wrap.

Although 180° Ω-wrap type VTRs have had extensive acceptance for home and industrial or educational uses, problems are encountered in adapting this type of VTR for use in the broadcasting field which requires a relatively large frequency range. It will be noted that the frequency range of a VTR is dependent on the speed of each rotary head relative to the tape during recording and reproducing or playback operations. In the usual 180° Ω-wrap type VTR having two substantially diametrically opposed rotary heads and intended for use with NTSC video signals, the heads are rotated at a speed of 30 revolutions per second so that the two heads will alternately record or reproduce successive fields of video signal information in respective parallel tracks extending obliquely across substantially the entire width of the magnetic tape. In other words, each track extending obliquely across substantially the entire width of the tape has a field interval recorded therein. If the rotational speed of the rotary heads is retained at 30 revolutions per second, then an increase in the relative head-to-tape speed, for example, for expanding the possible frequency range to the extent necessary for broadcast use, can be achieved by very substantially increasing the diameter of the tape guide drum and of the circular path followed by the rotary heads in recording and reproducing operations. However, increasing the diameter of the tape guide drum correspondingly increases the overall dimensions of the VTR and makes it difficult to design the latter as a portable machine.

In order to increase the relative head-to-tape speed in a 180° Ω-wrap helical scan VTR without increasing the tape guide drum diameter, it has been proposed to divide each field of the recorded video signal into a plurality of segments which are recorded in respective successive parallel tracks each extending obliquely across substantially the entire width of the tape. Thus, for example, the rotational speed of the rotary head or heads may be increased so that each of the oblique tracks extending across substantially the entire width of the magnetic tape will contain recorded signal information corresponding to only one-third of a field interval, that is, three successive tracks will be employed for recording one respective field of the video signals. Although the foregoing permits an increase in the head-to-tape speed for expanding the frequency range without undesirably increasing the tape guide drum diameter, the use of two or more successive oblique tracks for recording each field of the video signals requires head switching at one or more points in each the field intervals during recording and reproducing operations. In the case where the plurality of successive tracks in which each field of the video signals is recorded extend obliquely across substantially the entire width of the tape, there is a relatively large distance along the tape between the head switching points, that is, between the point on one track where reproducing therefrom is terminated and the point on the next track where reproducing therefrom is commenced. Thus, when the magnetic tape stretches after recording, a significant change can occur in the distance between the head switching points and the resulting so-called jumping jitter due to skew distortion may exceed the horizontal blanking interval when reproducing the video signals so as to cause discontinuity of the resulting reproduced image or picture on the screen of a monitor or television receiver and deterioration of the color fidelity when reproducing color video signals.

By reason of the foregoing, helical scan VTRs employed for broadcasting use have usually been of the 360° Ω-wrap or α-wrap type, for example, as disclosed specifically in U.S. Pat. No. 3,188,385, having a common assignee herewith. In such apparatus, a single rotary head is employed for recording and reproducing successive fields of video signals in respective successive tracks extending obliquely across substantially the entire width of the magnetic tape. Since a complete field interval is recorded in each of the tracks, the rotary speed of head is 60 revolutions per second for desirably increasing the head-to-tape relative speed and, furthermore, the head switching points occur in the vertical blanking intervals which are not exceeded by the possible jumping jitter. However, as previously noted, helical scan VTRs of the 360° Ω-wrap or α-wrap type are generally undesirable in that there is relatively large frictional resistance to longitudinal movement of the tape and it is difficult to maintain smooth engagement of the tape with the guide drum.

OBJECTS AND SUMMARY OF THE INVENTION

According, it is an object of this invention to provide a helical scan VTR which avoids the above-mentioned problems so as to be suitable for use in the broadcasting field.

More particularly, it is an object of this invention to provide a helical scan VTR with a sufficiently high head-to-tape speed to afford a frequency range suitable for use in the broadcasting field and without requiring an undesirable increase in the tape guide drum diameter so that the VTR can be readily designed to be portable.

Another object is to provide a helical scan VTR, as aforesaid, in which jumping jitter due to skew distortion is minimized or substantially eliminated while employing a so-called 180° Ω-wrap.

In accordance with an aspect of this invention, a helical scan VTR is provided with a plurality of rotary magnetic heads moving in respective circular paths that coincide with the tape guide drum surface and are spaced axially from each other so that longitudinal zones substantially equally dividing the width of the magnetic tape are obliquely traversed by respective ones of the rotary heads in a repeating cyclic order, and the rotary heads are angularly spaced from each other so as to provide at least one overlapping interval in the mentioned repeating cyclic order in which two of the heads are simultaneously traversing the respective zones. In the recording mode of operation of the apparatus, rotary movements of the heads are controlled so that the cyclic order in which the heads obliquely traverse the respective zones of the tape is repeated once for each field interval of the video signals being recorded, with the result that tracks scanned by the heads in the respective zones of the tape have substantially equal respective fractions of field intervals of the video signals recorded therein. In the reproducing or playback mode of opeation of the apparatus, signals reproduced by the heads from the tracks scanned thereby in obliquely traversing the respective zones of the tape in the repeating cyclic order are sequentially combined in such order so as to constitute the reproduced video signals and a comparator phase compares signals, for example, horizontal synchronizing signals, reproduced simultaneously by the two heads which are simultaneously traversing the respective zones of the tape during the mentioned overlapping interval, so as to provide a compared output determining the level of a head shift signal by which at least one of the rotary heads is displaced in the direction along the respective tracks scanned thereby. For example, at least one of the rotary heads may be mounted on a rotary portion of the guide drum by means of a bimorph leaf which receives the head shift signal and effects movement of the respective head in the direction along the respective tracks in response to changes in the head shift signal. By means of the foregoing arrangement, phase differences between those fractions of the field intervals of video signals reproduced from oblique tracks in one longitudinal zone of the tape and the fractions of the corresponding fields of the video signals reproduced from the other longitudinal zones of the tape are substantially eliminated so as to reduce or eliminate jumping jitter and skew distortion.

The above, and other objects, features and advantages of the invention, will be apparent in the following detailed description of an illustrative embodiment thereof which is to be read in connection with the accompanying drawings.

BRIEF DESCRIPTION OF THE DRAWINGS

FIG. 4 is a schematic block diagram showing the essential components of a reproducing or playback section of a helical scan VTR in accordance with this invention;

FIGS. 5A–5J are waveforms to which reference will be made in explaining the operation of the VTR according to this invention; and FIGS. 6A and 6B are additional waveforms to which reference will be made in explaining the operation of the VTR according to this invention.

DESCRIPTION OF A PREFERRED EMBODIMENT

Figure 1:
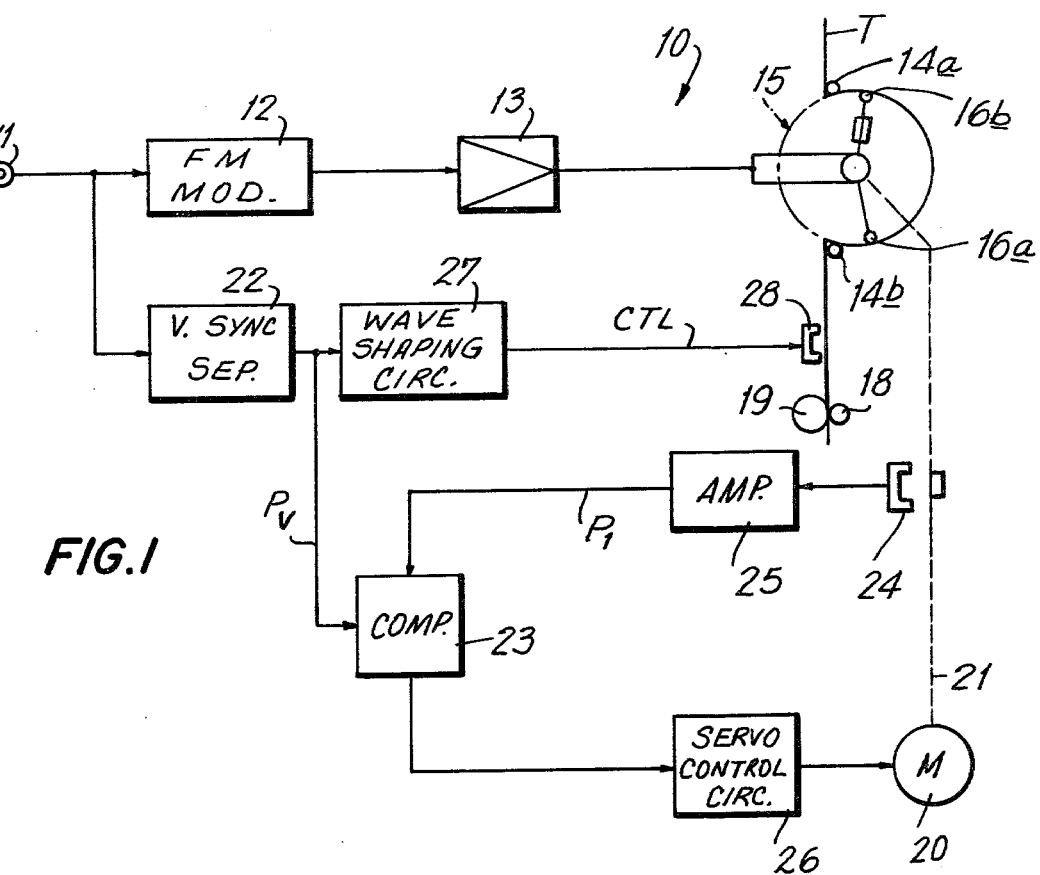
FIG. 1 is a schematic block diagram showing only those components of a recording section of a helical scan VTR according to this invention which are necessary for an understanding of the invention.

Referring to the drawings in detail, and initially to FIG. 1 thereof, it will be seen that, in an apparatus 10 for recording video signals according to this invention, and which is generally a helical scan VTR of the 180° Ω-wrap type, the video signals to be recorded are applied, by way of an input terminal 11, to a frequency modulator 12 in which the video signals conventionally frequency modulate a suitable carrier to provide frequency modulated signals to a recording amplifier 13. The magnetic tape T, on which the video signals are to be recorded, is guided, as by guide rollers 14a and 14b, in a helical path about a portion of a cylindrical guide surface on a guide drum 15. A plurality of rotary magnetic heads, for example, the heads 16a and 16b, are associated with guide drum 15 so as to move in respective circular paths that coincide with the guide surface of drum 15 and that are axially spaced apart, as shown particularly on FIG. 2. In the case where the apparatus 10 employs substantially a 180° Ω-wrap so that tape T extends about slightly more than one-half of the circumference of the guide surface on drum 15, as shown on FIG. 1, the heads 16a and 16b are preferably angularly spaced from each other by slightly less than 180°.

Figure 2:
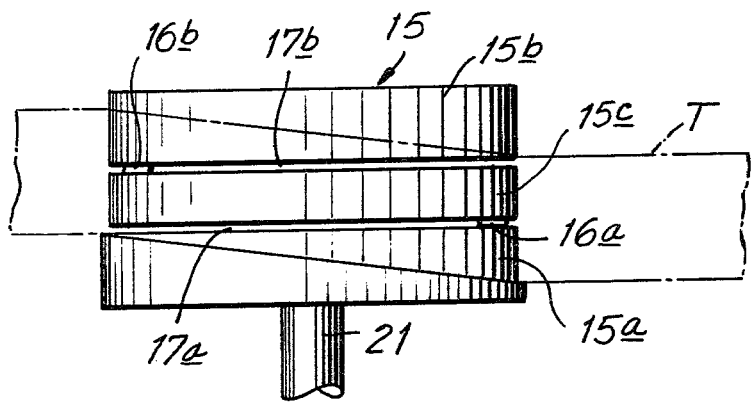
FIG. 2 is an enlarged side elevational view of a tape guide drum and associated rotary magnetic heads included in the apparatus of FIG. 1.

As is shown particularly on FIG. 2, guide drum 15 may be constituted by upper and lower fixed portions 15a and 15b and a rotatable intermediate portion 15c disposed axially between fixed portions 15a and 15b with circumferential gaps 17a and 17b therebetween. The rotatable intermediate portion 15c and drum 15 may function as a head support with heads 16a and 16b being suitably mounted at the upper and lower surfaces of drum portion 15c so as to be axially spaced apart and to extend through gaps 17a and 17b for engagement with tape T.

In the recording mode of apparatus 10, the frequency modulated video signals from recording amplifier 13 are applied to rotary heads 16a and 16b while the tape T is longitudinally advanced at a predetermined speed by the cooperative action of a suitably rotated capstan 18 and a pinch roller 19. In the recording mode, the rotation of heads 16a and 16b, for example, by means of a motor 20 connected through a shaft 21 with rotary guide drum portion 15c, is controlled so that there will be one revolution of rotary drum portion 15c, and hence of the heads 16a and 16b mounted thereon, for each field of the video signals being recorded. In order to effect such control of the rotation of heads 16a and 16b during recording, apparatus 10 is shown to include a vertical synchronizing signal separator 22 connected to input terminal 11 for separating the vertical synchronizing signals $P_v$ from the video signals received by the input terminal, and for applying the separated vertical synchronizing signals to one input of a phase comparator 23. A reference pulse generator 24 associated with shaft 21 may include a permanent magnet rotating with shaft 21 and a coil fixidly positioned adjacent the shaft for generating reference pulse signals $P_1$ representative of the rotational position of one of the rotary heads, for example, the head 16a. Such reference pulse signals $P_1$ are applied through an amplifier 25 to another input of comparator 23 which compares the vertical synchronizing signals $P_v$ separated from the video signals with the rotational reference pulse signals $P_1$ from generator 24 so as to provide a corresponding compared output. The compared output from comparator 23 is applied to a servo control circuit 26 by which the rotational speed of motor 20 is controlled so as to cause head 16a to commence its scanning of tape T at the beginning of each field of the video signals being recorded.

Figure 3:
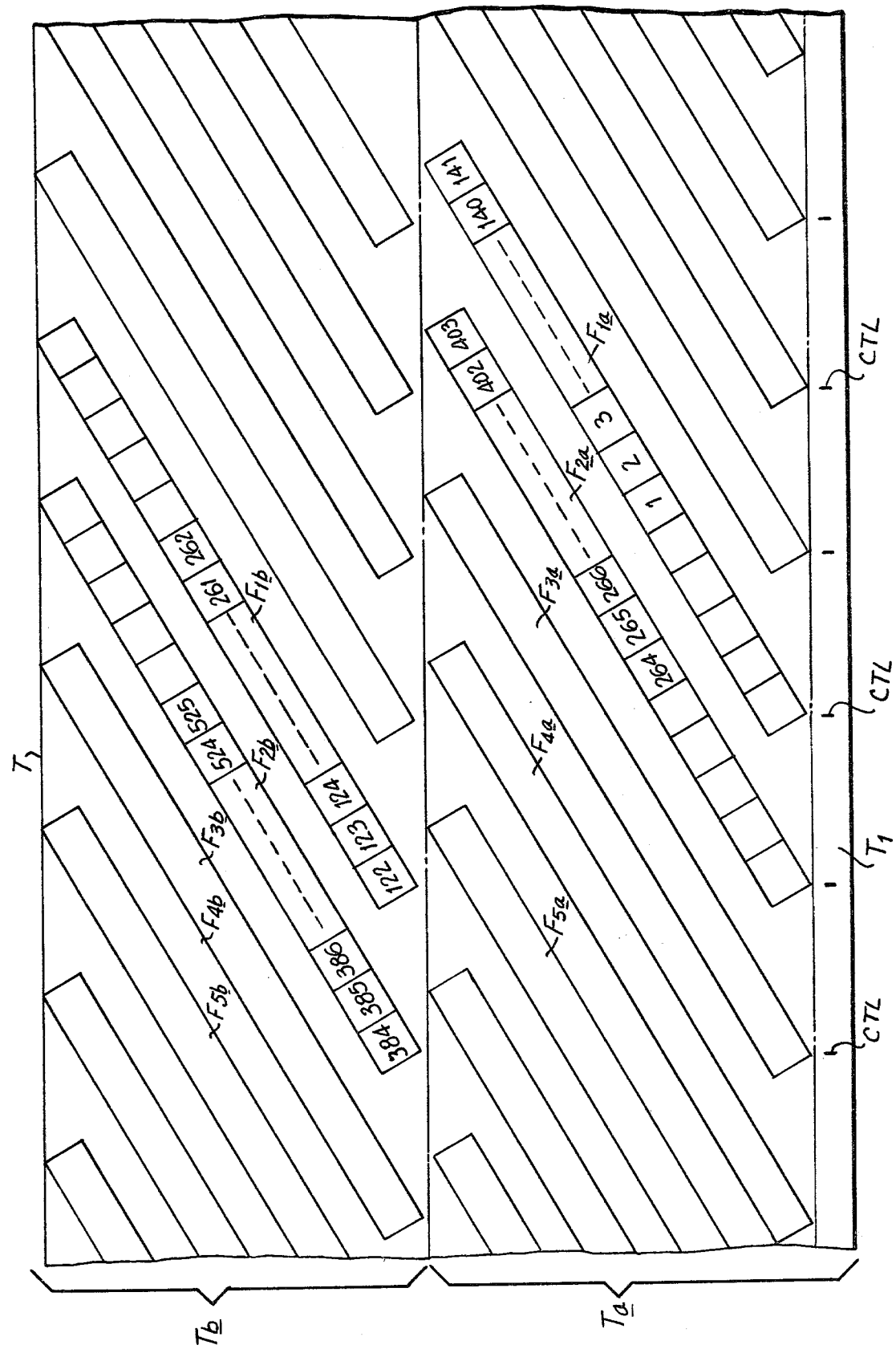
FIG. 3 is an enlarged diagrammatic view showing a fragmentary length of magnetic tape on which video signals have been recorded in accordance with this invention.

The vertical synchronizing signals $P_v$ from separator 22 are further applied to a waveshaping circuit 27 to produce corresponding control signals CTL which are applied to a fixed magnetic head 28 disposed adjacent one of the longitudinal edge portions $T_1$ (FIG. 3) of the tape T. Thus, as the tape is moved longitudinally by capstan 18 and pinch roller 19 and heads 16a and 16b are rotated by motor 20 for recording each field interval of the video signals in respective tracks on the tape, fixed head 28 records control signals CTL at suitably spaced apart locations along longitudinal edge portion $T_1$ of the tape T for identifying the positions along the tape of the tracks recorded by head 16a.

It is to be noted that, in the apparatus 10 according to this invention, the angular spacing of the plurality of rotary magnetic heads and the axial spacing of the circular paths in which the respective heads move are selected so that the plurality of rotary heads will obliquely traverse respective longitudinal zones that substantially equally divide the width of the tape wrapped helically about at least a portion of the circumference of the guide drum. More particularly, in the case where there are two rotary heads 16a and 16b, as shown, the rotation of such heads by motor 20 will cause two longitudinal zones $T_a$ and $T_b$ (FIG. 3) substantially equally dividing the width of tape T to be obliquely traversed by heads 16a and 16b, respectively, in a repeating cyclic order. Thus, as tape T is advanced or moved longitudinally during rotation of heads 16a and 16b, leading and following approximate halves of successive field intervals of video signals will be recorded in parallel tracks extending obliquely on tape T in the longitudinal zones $T_a$ and $T_b$, respectively. For example, as shown particularly on FIG. 3, the leading and following approximate halves of a first field interval will be recorded by heads 16a and 16b in tracks $F_{1a}$ and $F_{1b}$ in zones $T_a$ and $T_b$, respectively, and the heading and following approximate halves of the next or second field interval for completing a frame will be similarly recorded in tracks $F_{2a}$ and $F_{2b}$ extending obliquely in zones $T_a$ and $T_b$, respectively. Similarly, the leading and following approximate halves of subsequent field intervals will be recorded in oblique tracks $F_{3a}$ and $F_{3b}$, $F_{4a}$ and $F_{4b}$, —etc. extending across zones $T_a$ and $T_b$, respectively.

In describing the oblique tracks in zones $T_a$ and $T_b$ as having leading and following approximate halves of field intervals, recorded therein, it is meant that each track contains slightly more than one-half of a field interval. Thus, for example, as shown on FIG. 3, in the case of NTSC video signals having 525 lines or horizontal intervals in each frame, tracks $F_{1a}$ and $F_{1b}$ may respectively contain lines 1 through 141 and lines 122 through 262 of a first field of video signals, while tracks $F_{2a}$ and $F_{2b}$ respectively contain lines 264 through 403 and lines 384 through 525 of the next field of the video signals. The foregoing results from the fact that the tape T is wrapped about slightly more than one-half the circumference of guide drum 15 and heads 16a and 16b are angularly spaced apart by slightly less than 180°, as previously described. Thus, in the repeating cyclic order in which heads 16a and 16b respectively traverse zones $T_a$ and $T_b$, there is a first overlapping interval, as indicated at $O_1$ on FIGS. 5A and 5B, in which head 16a continues to scan a track in zone $T_a$ for recording therein or reproducing the leading approximate half of a field interval while the head 16b commences the scanning of a track in the zone $T_b$ for recording therein or reproducing the following approximate half of the same field interval. Such first overlapping interval $O_1$ is seen to be longer than a second overlapping interval $O_2$ (FIGS. 5A and 5B) of the repeating cyclic order in which the head 16b continues to scan a track in the zone $T_b$ to conclude the recording or reproducing of the second approximate half of a field interval while the head 16a commences to scan a track in the zone $T_a$ for recording or reproducing the leading approximate half of the next field interval.

Referring now to FIG. 4, it will be seen that, in an apparatus for reproducing video signals according to this invention, and which may be a reproducing or playback section of an apparatus that is alternatively operative to record the signals, as previously described with reference to FIG. 1, those elements employed in the reproducing operation that correspond to previously described elements employed for the recording operation are identified by the same reference numerals. Thus, in the apparatus illustrated on FIG. 4, the tape T having video signals recorded in oblique tracks thereon as described above with reference to FIG. 3 is guided, as by guide rollers 14a and 14b, so as to extend helically about a portion of the circumference of the tape guide drum 15 which has rotary magnetic heads 16a and 16b associated therewith. The tape T is adapted to be longitudinally advanced by the cooperative engagement therewith of a rotated capstan 18 and pinch roller 19. In the normal playback or reproducing mode, a tracking servo control system is employed for ensuring that the tracks $F_{1a}$, $F_{2a}$, —etc. in which the leading approximate halves of the successive fields of the video signals are recorded will be accurately tracked by head 16a in successive revolutions of the rotary portion 15c of the guide drum. More particularly, such tracking servo control system may include the fixed head 28 which reproduces the control signals CTL previously recorded on tape T at spaced apart locations in predetermined relation to the tracks $F_{1a}$, $F_{2a}$, —etc. Such reproduced control signals CTL are applied to one input of the phase comparator 23, while the other input of comparator 23 has applied thereto, by way of amplifier 24, the reference pulse signals $P_1$ produced by pulse generator 24 associated with shaft 21 for indicating the rotational position of head 16a. In accordance with the comparison of the phases of the reproduced control signals CTL and the reference pulse signals $P_1$, comparator 23 provides a compared output to a servo control circuit 26 by which motor 20 for driving the rotary head is suitably controlled.

Since a full revolution of heads 16a and 16b is required for recording or reproducing each field of video signals in the apparatus according to this invention, as distingished from the conventional helical scan VTR having a 180°Ω-wrap with two rotary magnetic heads and in which two fields of the video signals are recorded or reproduced during each revolution of the heads, it will be apparent that, for a tape guide drum of a given diameter, the tape-to-head relative speed will be twice as high in the apparatus according to this invention so as to adapt the same for broadcasting use. However, as each field of the video signals is recorded in a plurality of oblique tracks to be scanned by respective rotary heads in reproducing the video signals, head switching points occur within each field interval and jitter can arise by reason of the unavoidable stretching of the tape following the recording of signals thereon. Of course, in the apparatus according to the present invention, the tracks in which successive portions or fractions of each field of video signals are recorded extend obliquely only across respective zones $T_a$ and $T_b$ substantially equally dividing the width of magnetic tape T, as previously described. Therefore, the distance along the tape between the head switching points, that is, from the point at which, for example, head 16a ends its scanning of track $F_{1a}$ to the point at which head 16b commences its scanning of track $F_{1b}$, is substantially smaller than would be the corresponding distance between the head switching points in the event that fractions of a field of video signals were recorded in a plurality of successive tracks extending obliquely across the entire width of the tape. By reason of the relatively small distance along the tape between the head switching points in the case of video signals recorded in accordance with this invention, stretching of the tape will, at most, result in an amount of jitter than can be readily compensated or corrected as described below.

Generally, in the apparatus for reproducing video signals in accordance with this invention, at least one of the rotary heads, for example, the head 16b for reproducing the following or second approximate half of each field of recorded video signals, is mounted on rotary portion 15c of the guide drum for movement or displacement in respect thereto in the direction of the plane of rotation, that is, in the direction along the respective tracks $F_{1b}$, $F_{2b}$,—etc. scanned by head 16b, and such movement or displacement of head 16b relative to drum portion 15c is controlled so as to eliminate any phase difference that may exist between the signals being reproduced by heads 16a and 16b when such heads simultaneously scan tracks in zones $T_a$ and $T_b$ during each overlapping interval $O_1$.

More particularly, in the apparatus according to this invention, as shown on FIG. 4, rotary magnetic head 16b is mounted on rotary drum portion 15c by means of a bimorph leaf 30. As is known, such a bimorph leaf may comprise a pair of elongate thin strips of piezo-ceramic material which is polarized when manufactured and coated on its opposite surfaces with thin conductive layers, whereupon the two strips are secured or laminated together by a conductive cement. When a head shift signal ER is applied across the outer conductive layers of the laminate by way of suitable leads, the bimorph leaf is made to bend in one direction or in the other in dependence on the head shift signal so as to displace the respective head 16b relative to rotary drum portion 15c in a direction parallel to the plane of rotation of the latter.

Further, in the apparatus shown on FIG. 4, the signals $S_a$ and $S_b$ (FIGS. 5A and 5B) reproduced by heads 16a and 16b, respectively, in scanning tracks in zones $T_a$ and $T_b$ are applied through reproducing or playback amplifiers 31a and 31b to respective input terminals 32a and 32b of a switching circuit 32. Switching circuit 32 further has a movable contact 32c which alternately connects input terminals 32a and 32b with a frequency demodulator 33a for providing demodulated reproduced video signals from the latter to an output terminal 34.

The output of reproducing amplifier 31b is shown to be also applied to a frequency demodulator 33b for demodulating the portions of the video signals reproduced from tape T by rotary head 16b. The demodulated outputs of demodulators 33a and 33b are respectively applied to horizontal synchronizing signal separators 35a and 35b by which horizontal synchronizing signals $P_{ha}$ and $P_{hb}$ are separated from the signals demodulated from the outputs of heads 16a and 16b. The separated horizontal synchronizing signals $P_{ha}$ and $P_{hb}$ are applied to gate circuits 36a and 36b, respectively, which have their outputs connected to respective input terminals of a phase comparator 37. The compared output $\phi$ of comparator 37 is applied to an integrator 38 and the resulting integrated output of the latter is applied to a drive circuit 39 for producing the head shift signal ER for application to bimorph leaf 30 mounting head 16b.

Further, in the apparatus for reproducing video signals in accordance with this invention, as shown on FIG. 4, the reference pulse signals $P_1$ (FIG. 5C) produced by generator 24 at the commencement of the scanning by head 16a of each of the oblique tracks $F_{1a}$, $F_{2a}$,—etc. in zone $T_a$ is applied through amplifier 25 to a set terminal S of a flip-flop 40. Another generator 41 similar to the previously mentioned generator 24 is associated with shaft 21 for generating reference pulse signals $P_2$ (FIG. 5D) which are also representative of the rotational positions of heads 16a and 16b. More particularly, each reference pulse signal $P_2$ occurs near the conclusion of the overlapping interval $O_1$, that is, as the head 16a completes its scanning of each track in the longitudinal zone $T_a$. The reference pulse signals $P_2$ are shown to be applied through an amplifier 42 to a reset terminal R of the flip-flop 40. Thus, flip-flop 40 is set by each reference pulse signal $P_1$ to provide its output $S_1$ (FIG. 5E) at a relatively high or "1" level, and flip-flop 40 is reset by the next reference pulse signal $P_2$ for returning the output $S_1$ to its low or "0" level. Switching circuit 32 is controlled by output $S_1$ of flip-flop 40 so as to engage movable contact 32c with input terminal 32a, as shown on FIG. 4, when signal $S_1$ is at its high level, and to change-over switching circuit 32, that is, to engage movable contact 32c with input terminal 32b, when output $S_1$ of the flip-flop is at its low level.

The reference pulse signals $P_1$ are further shown to be applied to a monostable multivibrator 43 which is triggered thereby to produce an output MM (FIG. 5F) applied to a set terminal S of a flip-flop 44. The flip-flop 44 also has a reset terminal R which receives the reference pulse signals $P_2$. The output $S_2$ (FIG. 5G) of flip-flop 44 is applied as a gating signal to gate circuits 36a and 36b for opening the latter and permitting the passage therethrough of horizontal synchronizing signals $P_{ha}$ and $P_{hb}$ to the respective inputs of comparator 37 whenever output $S_2$ is at its high or "1" level. It will be noted that flip-flop 44 is set to provide the high level of its output $S_2$ (FIG. 5G) in response to the falling edge of output MM (FIG. 5F) of monostable multivibrator 43, and further that flip-flop 44 is reset to restore its output to the low or "0" level in response to the next reference pulse signal $P_2$ received from generator 41.

The described apparatus for reproducing video signals in accordance with this invention operates as follows:

As previously noted, the comparison in comparator 23 of the control signals CTL reproduced by fixed head 28 from the recorded tape T with the reference pulse signals $P_1$ from generator 24 is effective, by means of servo control circuit 26, to cause head 16a to accurately scan each of the successive tracks $F_{1a}$, $F_{2a}$,—etc. in zone $T_a$ on the tape. During the scanning of each track in zone $T_a$ by head 16a, that is, in the interval between each reference pulse signal $P_1$ (FIG. 5C) and the next reference pulse signal $P_2$ (FIG. 5D) flip-flop 40 is in its set condition and its output $S_1$ (FIG. 5E) is at a high level to maintain switching circuit 32 in the condition shown on FIG. 4. Thus, the signal $S_a$ (FIG. 5A) being reproduced by head 16a from a track in zone $T_a$ is applied through switching circuit 32 to demodulator 33a and the resulting demodulated video signal is applied to output terminal 34 and also to horizontal synchronizing signal separator 35a. The occurrence of reference pulse signal $P_1$ also triggers monostable multivibrator 43 and the latter provides its output MM (FIG. 5F) for a predetermined period so that its falling edge will occur shortly after the commencement of the overlapping interval $O_1$, that is, shortly after the commencement of the scanning of a track in zone $T_b$ by rotary head 16b. In response to such falling edge of the output MM of multivibrator 43, flip-flop 44 is set to provide its output $S_2$ (FIG. 5G) at the relatively high level for opening gate circuits 36a and 36b. Since flip-flop output $S_2$ remains at the high level only until flip-flop 44 is reset by the next reference pulse signal $P_2$, it will be apparent that gate circuits 36a and 36b are opened only for a period within the overlapping interval $O_1$.

During such overlapping interval $O_1$, head 16a will be completing the reproducing of a leading portion of a field of video signals recorded in a track extending across zone $T_a$, and head 16b will be commencing its reproduction of the following portion of the same field of video signals recorded in a respective track extending across zone $T_b$. Thus, simultaneously with the application of the output $S_a$ (FIG. 5A) from head 16a through switching circuit 32 to frequency demodulator 33a, frequency demodulator 33b will be receiving the output $S_b$ (FIG. 5B) from rotary head 16b. Accordingly, during each overlapping interval $O_1$, demodulated outputs $S'_a$ and $S'_b$ (FIGS. 6A and 6B) will be simultaneously obtained from demodulators 33a and 33b, respectively, and will correspond to the signals $S_a$ and $S_b$ being then simultaneously reproduced by heads 16a and 16b. If the tape has stretched after the recording of signals thereon, or if there is otherwise any skew distortion, the horizontal synchronizing signals $P_{ha}$ and $P_{hb}$ separated from the demodulated signals $S'_a$ and $S'_b$ by separators 35a and 35b and being passed through open gate circuits 36a and 36b to phase comparator 37 will have phase deviations, as is apparent from FIGS. 6A and 6B. Thus, during overlapping interval $O_1$, phase comparator 37 will provide a suitable compared output $\phi$ (FIG. 5H) through integrator 38 to drive circuit 39 which provides a corresponding head shift signal ER to bimorph leaf 30. It will be noted that the head shift signal ER provided by drive circuit 39 to bimorph leaf 30 is changed only during each overlapping interval $O_1$ and is otherwise maintained constant. In any case, the effect of a change in head shift signal ER applied to bimorph leaf 30 is to cause a movement or displacement of head 16b in the direction parallel to the plane of its rotation, and in the sense for restoring phase alignment of the horizontal synchronizing signals $P_{hb}$ separated from the output of head 16b with the horizontal synchronizing signals $P_{ha}$ separated from the output of head 16a. Thus, the effect of the change or variation in the head shift signal ER applied to bimorph leaf 30 is to cause a phase shift of the signal $S'_b$ demodulated from the output of head 16b from the position shown in full lines to the position shown in broken lines on FIG. 6B.

It is to be noted that the width of the high level portion of the gating pulse or output $S_2$ of flip-flop 44 and also the extent of the overlapping interval $O_1$ are dependent on the response speed of the bimorph leaf 30. In other words, the overlapping interval $O_1$ is of sufficient duration so that the bimorph leaf 30 can fully respond to any change in the head shift signal ER occurring during the gating pulse within such interval. In order to ensure that the interval $O_1$ will be of sufficient duration for the foregoing purpose, such overlapping interval $O_1$ has been made longer than the overlapping interval $O_2$ between successive fields of video signals and such relation of the intervals $O_1$ and $O_2$ has been achieved by making the angular spacing between heads 16a and 16b somewhat less than 180°.

Upon the completion of the change in position or displacement of head 16b relative to drum portion 15c, that is, upon the occurrence of each reference pulse signal $P_2$, flip-flops 40 and 44 are reset with the result that switching circuit 32 is changed-over to supply the output $S_b$ from head 16b to frequency demodulator 33a and gate circuits 36a and 36b are closed. This, in each period from the reference pulse signal $P_2$ to the occurrence of the next reference pulse signal $P_1$, the output from head 16b is demodulated in demodulator 33a and thence applied to output terminal 34. In other words, in each period from a reference pulse signal $P_1$ to a reference pulse signal $P_2$, output terminal 34 receives the demodulated signal reproduced by head 16a from a track in zone $T_a$ and, in the following period from reference pulse signal $P_2$ to the next reference pulse signal $P_1$, output terminal 34 receives the demodulated signal reproduced by head 16b from a track in zone $T_b$. Further, during each overlapping interval $O_1$ any phase distortion or jitter is corrected by a corresponding shifting of the head 16b in the direction along the respective track being scanned thereby prior to the appearance of the respective signal at output terminal 34.

As is well-known, a bimorph leaf exhibits a hysteresis effect. In other words, the bimorph leaf 30 mounting head 16b on guide drum portion 15c may not return to its original position upon the removal therefrom of the head shift signal ER. Therefore, in the case of a recording and/or reproducing apparatus in accordance with this invention, that is, in an apparatus in which the same heads 16a and 16b and associated tape guide drum 15 are employed for both recording and reproducing or playback operations, the head shift signal ER is applied from drive circuit 39 to bimorph leaf 30 by way of a playback contact P of a switch $SW_1$ which is positioned as shown on FIG. 4 in the reproducing or playback mode of operation. However, in the recording mode of operation, switch $SW_1$ is changed over to engage its contact R to which a hysteresis erase signal RE (FIG. 5J) is applied from a suitable generator 45. Thus, when changing over to the recording mode of operation, the hysteresis erase signal RE is initially applied to bimorph leaf 30 for restoring the latter to its original position and thereby ensuring that recording operation of the apparatus will be effected with heads 16a and 16b in a fixed or predetermined angular relation to each other.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Appparatus for reproducing signals recorded in parallel tracks extending obliquely on a magnetic tape in a plurality of different longitudinal zones which divide the width of said tape, said apparatus comprising:
   a plurality of rotary magnetic heads respectively corresponding to said zones and obliquely traversing the respective zones of the tape in a repeating cyclic order wherein each head transverses said magnetic tape commencing substantially at one boundary and ending substantially at another boundary of said respective zone, and having at least one overlapping interval in which two of said heads are simultaneously traversing said respective zones;
   means for sequentially combining, in said repeating cyclic order, signals reproduced by said heads from tracks scanned thereby in obliquely traversing said respective zones;
   comparator means for comparing signals reproduced simultaneously by the two heads which are simultaneously traversing the respective zones during each said one overlapping interval and providing a compared output determined by the relation of the compared signals to each other;
   means for generating a head shift signal in dependence on said compared output from said comparator means; and
   means for displacing at least one of said heads in the direction along the respective tracks scanned thereby in response to said head shift signal.

2. Apparatus according to claim 1; in which the recorded signals are video signals, and the tracks in said plurality of zones have substantially equal respective fractions of field intervals of the video signals recorded therein.

3. Apparatus according to claim 1; further comprising guide drum means having a cylindrical guide surface; and in which the magnetic tape extends helically on at least a portion of said guide surface, and said rotary heads move in respective, axially spaced apart circular paths that coincide with said guide surface.

4. Apparatus according to claim 1; in which there are two of said rotary magnetic heads which respectively traverse first and second zones of the magnetic tape, the tracks in said first and second zones have leading and following approximate halves, respectively, of field intervals of video signals recorded therein, and the head traversing said second zone is the one which is displaced in the direction along the respective tracks in response to said head shift signal.

5. Apparatus according to claim 4; in which said video signals include horizontal synchronizing signals; and further comprising means for separating said horizontal synchronizing signals from the signals reproduced by said two heads, and means for applying to said comparator means, during each said overlapping interval, the horizontal synchronizing signals being then separated from the signals simultaneously reproduced by said two heads.

6. Apparatus according to claim 1; further comprising guide drum means having a cylindrical guide surface; and in which the magnetic tape extends helically about at least a portion of the circumferential extent of said guide surface, said longitudinal zones of the tape are first and second zones containing tracks in which leading and following approximate halves, respectively, of field intervals of video signals and recorded, said rotary magnetic heads are first and second heads operatively associated with said guide drum to move in respective circular paths that coincide with said guide surface and are axially spaced apart on the latter for causing said first and second heads to traverse said first and second zones, respectively, and said second head is the one which is displaced in the direction along the tracks in said second zone in response to said head shift signal.

7. Apparatus according to claim 6; in which said guide drum means includes a rotary portion functioning as a head support and having said first head fixed thereto at least in respect to the plane of rotation of said first head with said head support, and said means for displacing at least one of said heads includes a bimorph leaf by which said second head is mounted on said head support, said bimorph leaf receiving said head shift signal and being arranged for shifting said second head relative to said head support in the direction of the plane of rotation of said second head in response to changes in said head shaft signal.

8. Apparatus according to claim 6; in which said first and second heads are angularly spaced from each other by less than 180°, and the tape extends about more than one-half of said circumferential extent of the guide surface so that a first overlapping interval in said repeating cyclic order, in which said first head continues to scan a track in said first zone containing the leading approximate half of a field interval while said second head commences the scanning of a track in said second zone containing the following approximate half of the same field interval, is longer than a second overlapping interval in said repeating cyclic order, in which said second head continues to scan a track in said second zone while said first head commences to scan a track in said first zone contaning the leading approximate half of the next field interval.

9. Apparatus according to claim 8; in which said means for sequentially combining the signals reproduced by said heads includes means for generating reference pulse signals representative of the rotational positions of said heads, an output terminal, switch means having alternate first and second conditions in which signals reproduced by said first and second heads, respectively, are applied to said output terminal, and switch control means responsive to said reference pulse signals to change-over said switch means from said first condition to said second condition near the conclusion of each said first overlapping interval and to return the switch means to said first condition near the conclusion of said second overlapping interval.

10. Apparatus according to claim 9; in which said video signals include horizontal synchronizing signals; and further comprising means for separating said horizontal synchronizing signals from the signals reproduced by said first and second heads, respectively, gate means for applying to said comparator means the horizontal synchronizing signals separated from said signals reproduced by said first and second heads, respectively, and gate control means responsive to said reference pulse signals to provide gating signals for opening said gate means only during a portion of each said first overlapping interval prior to said change-over of the switch means from said first condition to said second condition.

11. Apparatus according to claim 1; in which said means for displacing at least one of said heads includes a bimorph leaf receiving said head shift signal and mounting said one head for movement in said direction along the respective tracks in response to changes in said head shift signal.

12. Apparatus for recording and/or reproducing video signals on a magnetic tape comprising:
   guide drum means having a cylindrical guide surface;
   means guiding a magnetic tape so as to wrap the latter helically about at least a portion of the circumference of said guide surface;
   a plurality of angularly spaced apart rotary magnetic heads associated with said guide drum means to move in respective circular paths that coincide with said guide surface and are spaced axially from each other so that different longitudinal zones substantially equally dividing the width of the tape are obliquely traversed by respective ones of said heads in a repeating cyclic order wherein each head traverses said magnetic tape commencing substantially at one boundary and ending substantially at another boundary of a respective one of said zones;
   a recording section operative in a recording mode of the apparatus and including means for applying video signals to said heads for recording by the latter in respective tracks scanned by the heads in obliquely traversing the respective zones, means for controlling the rotary movements of said heads in accordance with said video signals so that said cyclic order is repeated once for each field interval of the video signals, and the angular extent of said portion of the guide surface circumference and the angular spacing of said heads being selected so that said tracks in the different zones and being scanned by the respective heads in each revolution of the latter contain approximately equal respective fractions of a field interval and said repeating cyclic order includes at least one overlapping interval in which two of said heads are simultaneously traversing the respective zones on the tape; and
   a reproducing section operative in a reproducing mode of the apparatus and including means for sequentially combining, in said repeating cyclic order, signals reproduced by said heads from tracks scanned thereby in obliquely traversing said respective zones, comparator means for comparing signals reproduced simultaneously traversing the respective zones during each said one overlapping interval and providing a compared output determined by the relation of the compared signals to each other, means for generating a head shift signal in dependenence on said compared output from said comparator means, and means for displacing at least one of said heads in the direction along the respective tracks scanned thereby in response to said head shift signal.

13. Apparatus according to claim 12; in which there are first and second rotary magnetic heads which respectively traverse first and second zones of the magnetic tape each extending across approximately one-half of the tape width so that the tracks in said first and second zones have leading and following approximate halves, respectively, of field intervals of the video signals recorded therein, and said second head traversing said second zone is the one which, in the reproducing mode, is displaceable in the direction along the respective tracks in response to said head shift signal.

14. Apparatus according to claim 13; in which said video signals include horizontal synchronizing signals; and said reproducing section further includes means for separating said horizontal synchronizing signals from the signals reproduced by said first and second heads, and means for applying to said comparator means, during each said overlapping interval, the horizontal synchronizing signals being then separated from the signals simultaneously reproduced by said first and second heads.

15. Apparatus according to claim 13; in which said guide drum means includes a rotary portion functioning as a head support and having said first head fixed thereto at least in respect to the plane of rotation of said first head with said head support, and said means for displacing at least one of said heads includes a bimorph leaf by which said second head is mounted on said head support, said bimorph leaf receiving said head shift signal in said reproducing mode and being arranged for shifting said second head relative to said head support in the direction of the plane of rotation of said second head in respone to changes in said head shift signal.

16. Apparatus according to claim 13; in which said first and second heads are angularly spaced from each other by less than 180°, and the tape extends about more than one-half of said circumference of the guide surface so that, in said reproducing mode, a first overlapping interval in said repeating cyclic order, in which said first head continues to scan a track in said first zone containing the leading approximate half of a field interval while said second head commences the scanning of a track in said second zone containing the following approximate half of the same field interval, is longer than a second overlapping interval in said repeating cyclic order, in which said second head continues to scan a track in said second zone while said first head commences to scan a track in said first zone contaning the leading approximate half of the next field interval.

17. Apparatus according to claim 16; in which said means for sequentially combining the signals reproduced by said heads includes means for generating reference pulse signals representative of the rotational positions of said heads, an output terminal, switch means having alternate first and second conditions in which signals reproduced by said first and second heads, respectively, are applied to said output terminal, and switch control means responsive to said reference pulse signals to change-over said switch means from said first condition to said second condition near the conclusion of each said first overlapping interval and to return the switch means to said first condition near the conclusion of each said second overlapping interval.

18. Apparatus according to claim 17; in which said video signals include horizontal synchronizing signals; and said reproducing section further includes means for separating said horizontal synchronizing signals from the signals reproduced by said first and second heads, respectively, gate means for applying to said comparator means the horizontal synchronizing signals separated from said signals reproduced by said first and second heads, respectively, and gate control means responsive to said reference pulse signals to provide gating signals for opening said gate means only during a portion of each said first overlapping interval prior to said change-over of the switch means from said first condition to said second condition.

19. Apparatus according to claim 12; in which said means for displacing at least one of said heads includes a bimorph leaf mounting said one head for movement in said direction along the respective tracks in response to the application to said bimorph leaf of said head shift signal; and further comprising means for generating a bysteresis erase signal, and switch means for selectively applying said head shift signal and said hysteresis erase signal to said bimorph leaf.

* * * * *